US011331951B2

United States Patent
Cron et al.

(10) Patent No.: US 11,331,951 B2
(45) Date of Patent: May 17, 2022

(54) ENHANCED DURABILITY FOR A NON-PNEUMATIC TIRE SUPPORT

(71) Applicant: Compagnie Generale des Etablissements Michelin, Clermont-Ferrand (FR)

(72) Inventors: Steven M Cron, Simpsonville, SC (US); Ryan Michael Gaylo, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 115 days.

(21) Appl. No.: 16/959,069

(22) PCT Filed: Dec. 31, 2018

(86) PCT No.: PCT/US2018/068189
§ 371 (c)(1),
(2) Date: Jun. 29, 2020

(87) PCT Pub. No.: WO2019/133987
PCT Pub. Date: Jul. 4, 2019

(65) Prior Publication Data
US 2020/0331297 A1    Oct. 22, 2020

Related U.S. Application Data

(63) Continuation of application No. PCT/US2017/069177, filed on Dec. 31, 2017.

(51) Int. Cl.
*B60C 7/14* (2006.01)

(52) U.S. Cl.
CPC ............... *B60C 7/146* (2021.08); *B60C 7/14* (2013.01)

(58) Field of Classification Search
CPC .......... B60C 7/14; B60C 7/146; B60C 7/107; B60C 2007/146; B60C 2007/107; B60B 9/26
See application file for complete search history.

(56) References Cited

U.S. PATENT DOCUMENTS 1,349,019 A * 8/1920 Timberlake ............... B60B 9/26
152/80
1,665,558 A * 4/1928 Montgomery ............ B60B 9/02
152/94
(Continued)

FOREIGN PATENT DOCUMENTS

EP    E P-0051996 A2 * 5/1982 ............... B60B 5/02
FR    334354 A * 12/1903 ............... B60B 9/26
(Continued)

OTHER PUBLICATIONS

International Search Report and Written Opinion dated Apr. 25, 2019.

*Primary Examiner* — Kip T Kotter
(74) *Attorney, Agent, or Firm* — John Steckler Schwab

(57) ABSTRACT

A spoke (100) for a tire attaching an outer tread to a hub, the spoke (100) having first and second spoke elements (142, 144) possessing spoke element reinforcements, the spoke elements (142, 144) joined by a joint body (130) comprised of an elastomer connecting the first spoke element (142) to the second spoke element (144) and a reinforcement membrane (132) extending from the first spoke element (142) to the second spoke element (144) and having a first end (172) and a second end (170) and a middle portion (174), the first end (172) lying closer to the first spoke element reinforcements than the middle portion (174) and the second end (170) lying closer to the second spoke element reinforcements than the middle portion (174) of the spoke reinforcement membrane (132).

20 Claims, 7 Drawing Sheets

(56) References Cited

U.S. PATENT DOCUMENTS

| | | | | |
|---|---|---|---|---|
| 5,042,544 A | * | 8/1991 | Dehasse | B60C 7/12 |
| | | | | 152/302 |
| 5,358,210 A | * | 10/1994 | Simon | F16F 1/40 |
| | | | | 244/173.2 |
| 10,654,318 B2 | * | 5/2020 | Kim | B60C 7/14 |
| 2017/0368879 A1 | * | 12/2017 | Lettieri | B60C 7/14 |
| 2019/0009613 A1 | | 1/2019 | Cron et al. | |

FOREIGN PATENT DOCUMENTS

| | | | | | |
|---|---|---|---|---|---|
| FR | 552426 A | * | 5/1923 | | B60B 9/26 |
| FR | 1164324 A | * | 10/1958 | | B60B 17/0031 |
| FR | 1164324 A | | 10/1958 | | |
| FR | 2519910 A | * | 7/1983 | | |
| WO | WO-2010012091 A1 | * | 2/2010 | | B60B 9/04 |
| WO | 2018067597 A1 | | 4/2018 | | |
| WO | 2018126157 A1 | | 7/2018 | | |

\* cited by examiner

ENHANCED DURABILITY FOR A NON-PNEUMATIC TIRE SUPPORT

FIELD OF THE INVENTION

The subject matter of the present invention relates to a support structure for a tire.

BACKGROUND

Composite spoke structures have been used to support non-pneumatic tires such as described in publication WO2018/126157 and may be comprised of an elastomer and a second material having a relatively higher bending stiffness than the elastomer, the composite spring having a first hinge side and a second hinge side comprised of the second material, and a joint body comprised of the elastomer, wherein the second material comprising the first hinge side and second hinge side are discontinuous or otherwise separated from one another by the joint body connecting the first hinge side and the second hinge side. The spokes are attached to an outer tread band and may contain a structural support forming a shear band such as described in publications US 2018/0345718 or WO 2013/095499.

FIG. 2 provides a perspective view of one such prior art spoke. The nose portion, or otherwise referred to as the "joint body" 130 of the spoke is comprised of an elastomeric material and acts to connect a first and a second support element, here comprising a radially inner leg 142 and a radially outer leg 144 respectively. The nose portion becomes thicker in the circumferential direction ("C") between the radially inner leg 142 and radially outer leg 144. In reference to a single spoke as shown in this embodiment, the circumferential direction is generally orthogonal to both the radial direction and the lateral direction.

When the spoke is compressed, which would occur in this particular spoke by moving the radially outer elastomeric joint body 114 toward the radially inner elastomeric joint body 112, the elastomeric portion of the nose joint body 130 compresses and tension develops along the reinforcements in the nose reinforcement membrane 132 which come under tension. Over prolonged use or under high stress, cracks may develop adjacent to the radial ends 170, 172 of this membrane 132 and may result in delamination of the membrane or other tearing.

An improved spoke construction having an improved durability would be useful. It would be particularly useful to provide for an improved spoke construction that would prolong the useful life of the spoke and delay, reduce or eliminate the likelihood of crack formation, tearing or delamination.

SUMMARY OF THE INVENTION

Aspects and advantages of the invention will be set forth in part in the following description, or may be obvious from the description, or may be learned through practice of the invention.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
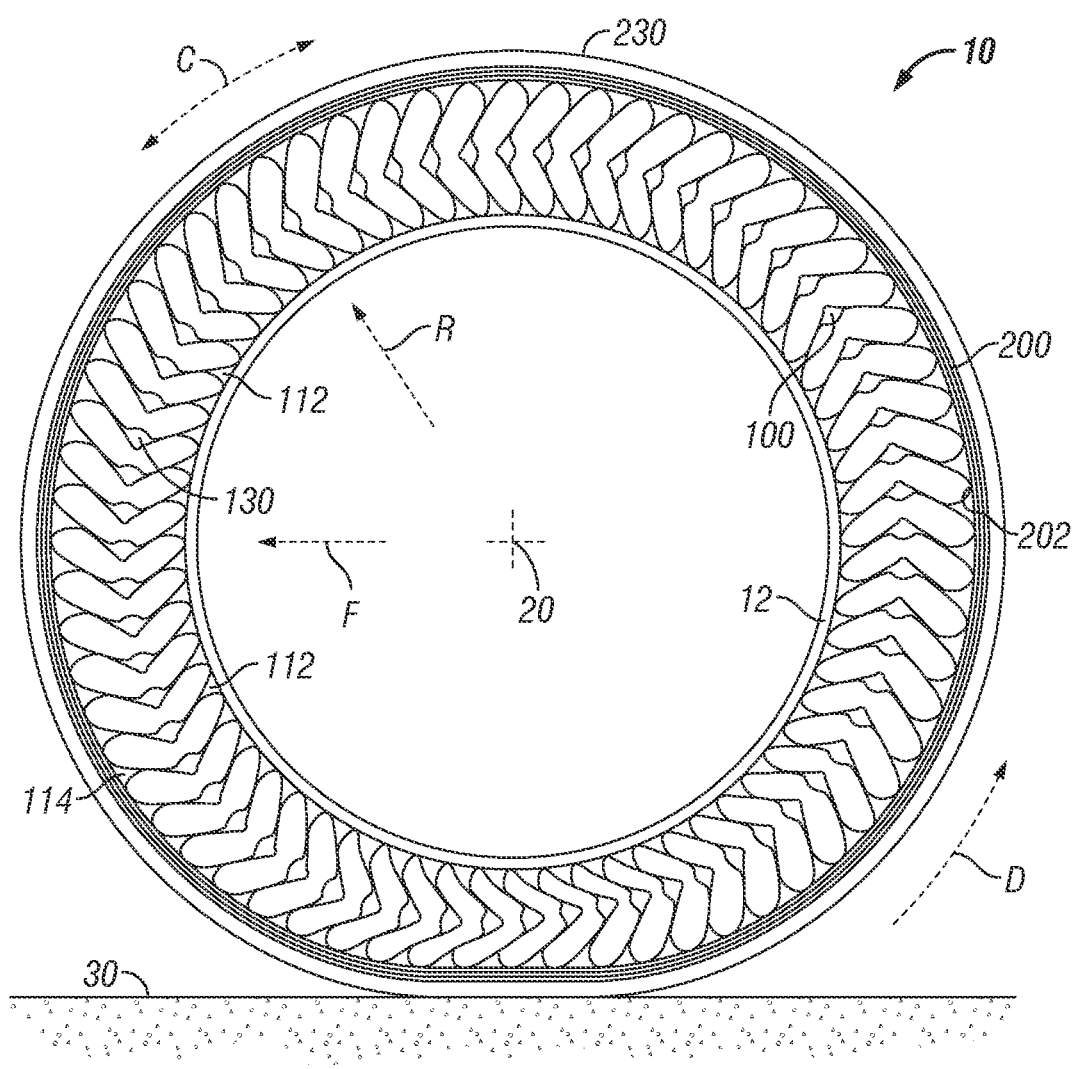
FIG. 1 provides a lateral side view of an exemplary embodiment of the present invention wherein a plurality of resilient composite structures are configured as spokes forming a part of a tire under nominal loading conditions.
Figure 2:
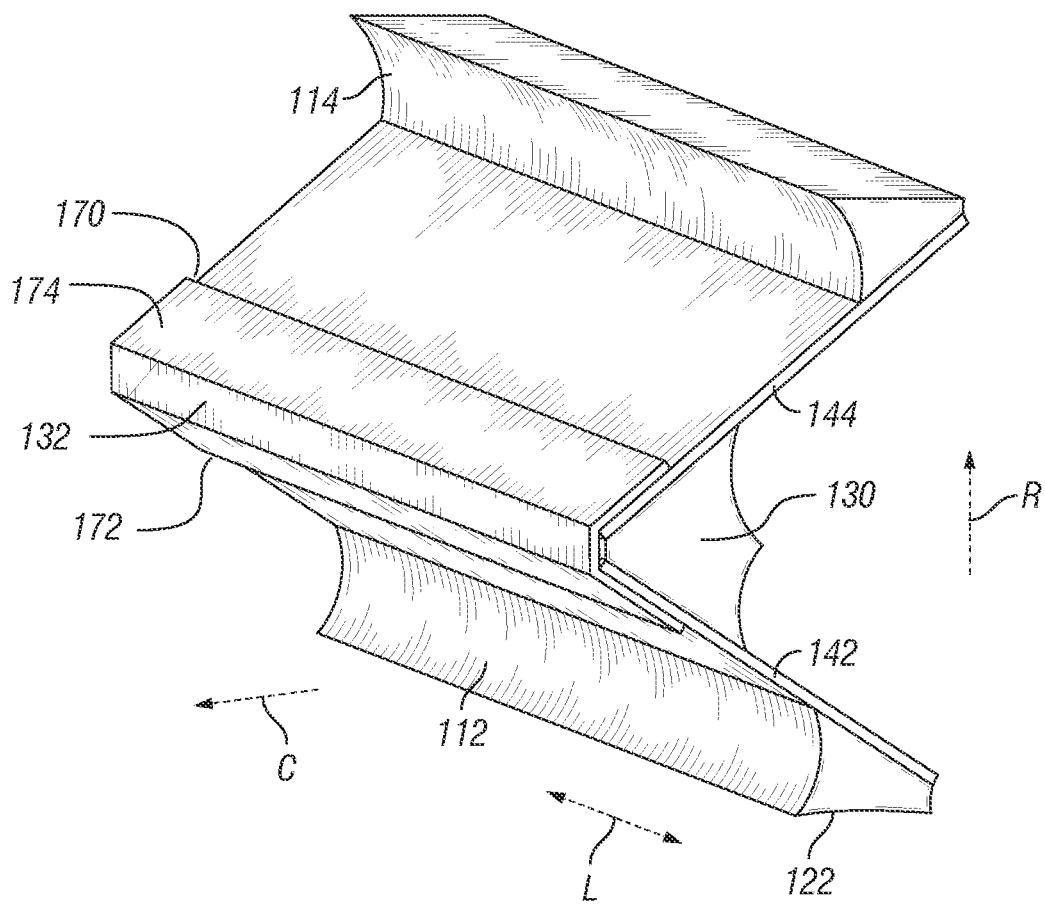
FIG. 2 provides a perspective view of a prior art structural support in the form of a spoke for a non-pneumatic tire.

The present invention provides an improvement to a mechanical structure for resiliently supporting a load. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer tread band and/or tire structure.

"Circumferential direction" or the letter "C" in the figures refers to a direction that is orthogonal to the axial direction and orthogonal to a radial direction.

"Forward direction of travel" or the letter "F" in the figures refers to the direction the tire was designed to predominantly travel in for aesthetics and or performance reasons. Travel in a direction different than the forward direction of travel is possible and anticipated.

"Direction of rotation" or the letter "D" in the figures refers to the direction the tire was designed to predominantly rotate in for aesthetics and/or performance reasons. Rotation in a direction opposite than the direction of rotation is possible and anticipated.

"Radial plane" means a plane that passes perpendicular to the equatorial plane and through the axis of rotation of the tire.

"Lateral direction" or the letter "L" means a direction that is orthogonal to an equatorial plane.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Interior angle" or "Internal angle" as used herein means an angle formed between two surfaces that is greater than 0 degrees but less than 180 degrees. An acute angle, a right angle and an obtuse angle would all be considered "interior angles" as the term is used herein.

"Exterior angle" or "External angle" or "Reflex angle" as used herein means an angle formed between two surfaces that is greater than 180 degrees but less than 360 degrees.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

FIG. 1 shows a lateral side view of an exemplary embodiment of the present invention wherein a plurality of resilient composite structures are configured as spokes 100 and are attached to an outer tread band 200 forming a part of a tire 10. The tire 10 may be incorporated into a wheel for a vehicle. For example the tire 10 may be part of non-pneumatic wheel having a hub 12 which is attached to a passenger vehicle allowing the vehicle to roll across a ground surface. Other objects and vehicles may incorporate the invention, including but not limited to: heavy duty truck, trailer, light truck, off-road, ATV, bus, aircraft, agricultural, mining, bicycle, motorcycle and passenger vehicle tires. Such a non-pneumatic wheel would possess a hub 12 that would have a radially outer surface having an axis of revolution about a central axis 20. The tire 10 may be attached to the hub 10 by any of a number of methods, for example, by mechanical fasteners such as bolts, screws, clamps or slots, and/or by adhesives such as cyanoacrylates, polyurethane adhesives, and/or by other bonding materials or a combination thereof.

The tire 10 shown here possesses an axis of rotation 20 about which the tire 10 rotates. In this exemplary embodiment, the radially outer surface 230 of the outer tread band 200 interfaces with a ground surface 30 over which the tire rolls forming a contact patch, or area of the outer band that conforms to the surface upon which it is in contact with. Under a nominal load, the spokes 100 of the tire flex as the tire enters and exits the contact patch. Smaller deflections occur in the spokes 100 as the spoke rotates about the axis 20 outside the contact patch, but most of the deflection occurs while the spoke 100 enters, exits and travels through the contact patch.

Each spoke 100 possesses a "nose" portion 130 which acts as a resilient hinge. The "nose" portion 130 is an elastomeric joint body connecting a support element forming the radially inner portion of the spoke and a support element forming the radially outer portion of the spoke. The support elements of the spoke 100 are initially positioned at an angle relative to each other. The angle between the spoke support elements measuring less than 180 degrees is the interior angle and the angle between the spoke support elements measuring greater than 180 degrees is the exterior angle. The elastomeric joint is comprised of an elastomer attached to each spoke support element and is positioned on the side of the spoke elements on the interior angle side.

In this embodiment, the radially inner portion of the spoke possesses a radially inner foot 112 which connects to another surface, which is the radially outer surface of the hub 12 in the present embodiment. In the present embodiment, the radially inner foot 112 is comprised of an elastomeric joint body that connects the radially outer support to the hub 12. The radially outer portion of the spoke 100 possesses a radially outer foot 114 which is comprised of another elastomeric body which connects the outer support element to yet another surface which is in the present embodiment the radially inner surface of the outer tread band 200.

In the exemplary embodiment shown, the tread band 200 comprises an elastomeric material and allows deformation to form a planar footprint in the contact patch. In the exemplary embodiment shown, the radially outer foot 114 of the spoke 100 is attached to the radially inner surface 202 of the tread band 200 and to the opposite side of the support element from the nose portion 130. In the exemplary embodiment shown, the spoke is adhered in place by a cyanoacrylate adhesive. In other embodiments, the spoke may be attached by other methods, including by adhering the elastomeric material together, for instance by using green rubber and curing the rubber components together, or using a strip of green rubber between cured or partially cured rubber components. In some embodiments, the outer tread band 200 may also possess a reinforcement to help carry the load circumferentially around the tire.

For this particular embodiment, the size of the tire 100 is equivalent to a pneumatic tire in the size 205/55R16 with the lateral width of the tread being about 165 mm.

Figure 3:
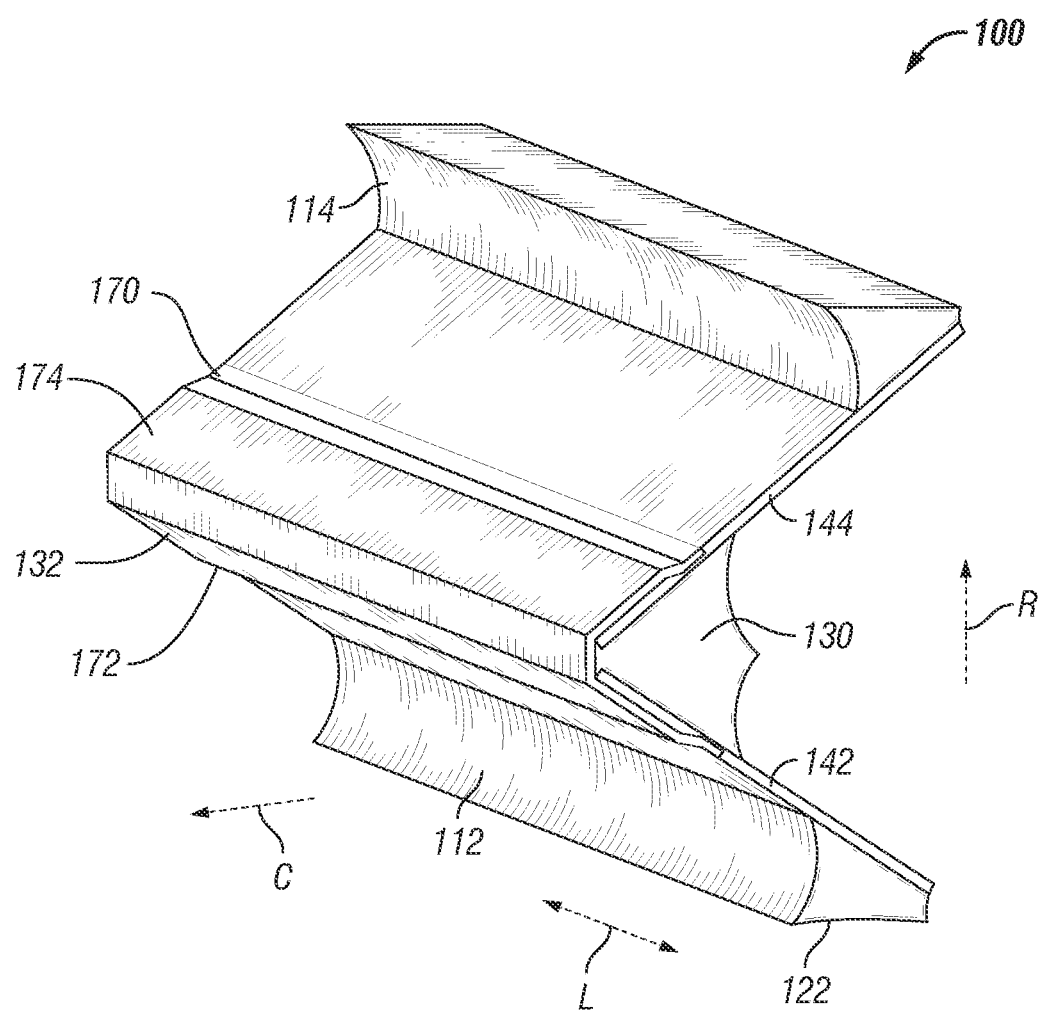
FIG. 3 provides a perspective view of an embodiment of the invention showing the reinforcement membrane edges pushed closer to the adjacent support element reinforcements.

FIG. 3 provides a perspective view of an embodiment of the invention, here it is shown in the embodiment of a spoke 100 for a non-pneumatic tire. The nose portion, or otherwise referred to as the "joint body" 130 of the spoke 100 is comprised of an elastomeric material and acts to connect a first and a second support element, here comprising a radially inner leg 142 and a radially outer leg 144 respectively. The nose portion becomes thicker in the circumferential direction ("C") between the radially inner leg 142 and radially outer leg 144. In reference to a single spoke as shown in this embodiment, the circumferential direction is generally orthogonal to both the radial direction and the lateral direction.

When the spoke is compressed, which would occur in this particular spoke by moving the radially outer elastomeric joint body 114 toward the radially inner elastomeric joint body 112, the elastomeric portion of the nose joint body 130 compresses and tension develops along the reinforcements in the nose reinforcement membrane 132.

A first cord portion of the nose reinforcement membrane, shown here as the radially outer end 170 of the nose reinforcement membrane 132 and a second cord portion of the nose reinforcement membrane, shown here as the radially inner end 172 of the nose reinforcement membrane 132 are positioned closer to the center of the radially outer leg 142 and radially inner leg 144 respectively than the elongate middle cord portion 174 of the nose reinforcement membrane. This positioning of the ends of the reinforcement closer to the reinforcements of the radially inner and radially outer legs 142, 144 reduces the likelihood of delamination of the membrane and results in a more durable spoke. One way to achieve this positioning of the ends 170, 172 of the nose reinforcement membrane 132 is by allowing the membrane to extend further along the mold walls used in the formation of the spoke, allowing the mold to press the membrane edges into the legs 142, 144 of the spoke 100.

Figure 4:
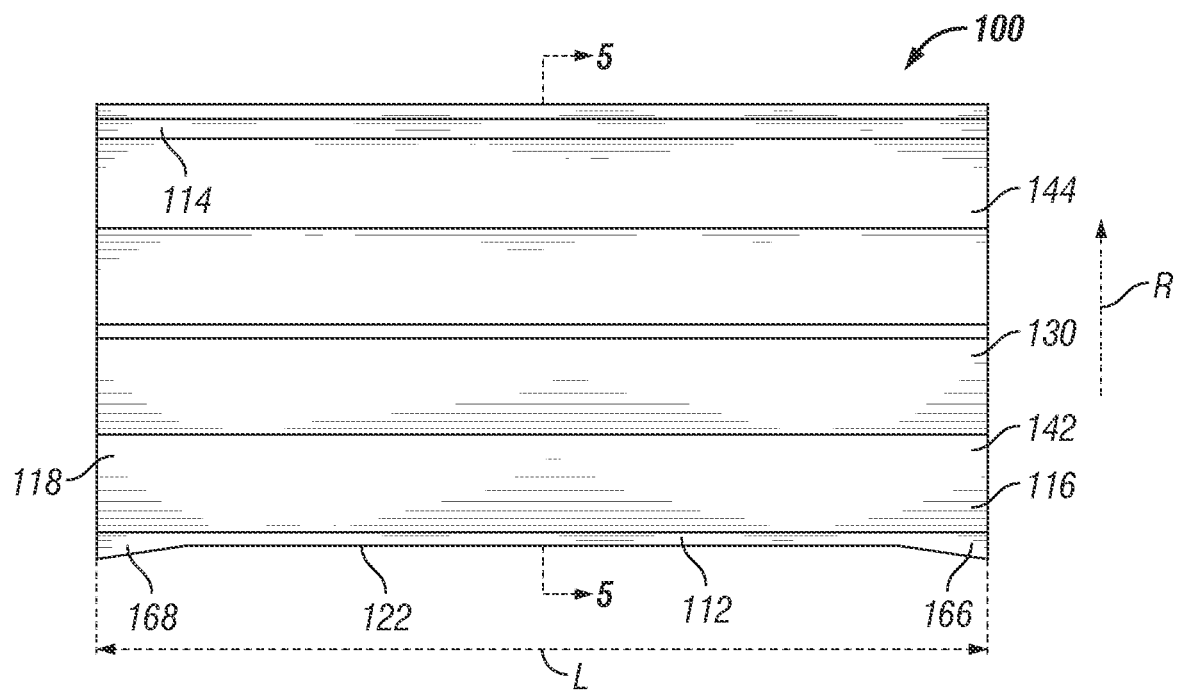
FIG. 4 provides a planar view of the embodiment of a spoke from the circumferential elevation.

FIG. 4 shows a front view of the spoke 100 of the embodiment in a circumferential direction. The radially inner surface possesses a first and second protrusion 166, 168 which creates radially inner surface 122 that is curved in the lateral direction. This causes the cross section of the spoke 100 to vary slightly in the lateral direction. In alternative embodiments the spoke 100 may maintain an identical cross section in the lateral direction, resulting in a laterally straight radially inner surface 122.

Figure 5:
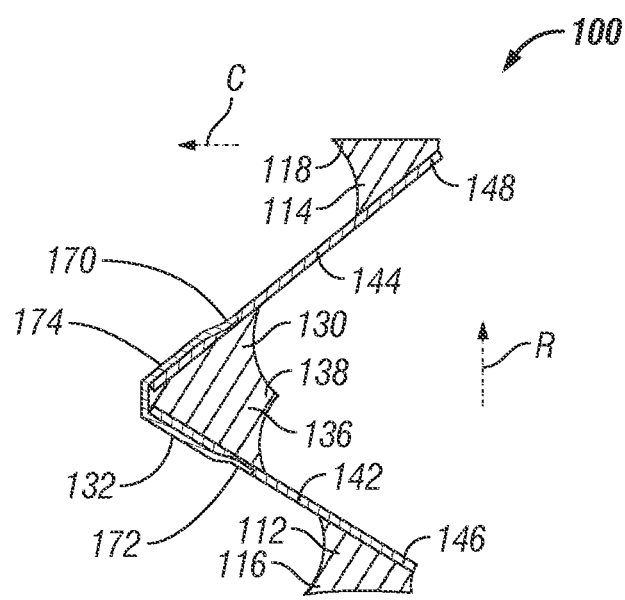
FIG. 5 provides a section view of the embodiment of the invention taken across the equatorial plane of the tire.

FIG. 5 shows a section view of the embodiment showing the main components of the spoke 100. The spoke 100 of the embodiment shown is comprised of rubber of the general type used in the construction of conventional rubber pneumatic radial tires, polyester cord material and fiberglass reinforced resin.

The rubber used in the embodiment shown comprises a relatively soft rubber having a modulus of 4.8 MPa in the areas of the radially inner elastomeric joint body 112 and radially outer elastomeric joint body 114. Each elastomeric joint body 112, 114 is attached to the radially inner leg 142 and radially outer leg 144 respectively. The radially inner leg 142 and radially outer leg 144 are constructed to give them flexural rigidity, that is, to allow them to resiliently deform when the spoke 100 is under compression or tension. The radially outer end 148 of the radially outer leg 144 is attached to the elastomeric joint body 114, but is otherwise "free" and may move to compress or stretch the elastomeric joint body 114 when the spoke is being stretched or compressed. Likewise the radially inner end 146 of the radially inner leg 142 is attached to the elastomeric joint body 112, but is otherwise "free" and may move to compress or stretch the elastomeric joint body 112 when the spoke 100 is under compression or tension. The radially inner elastomeric joint body 112 becomes thicker in the circumferential direction nearer the hub 12 to which it is attached. In the embodiment shown, the elastomeric joint body 112 flairs outward forming a protrusion 116 nearest the hub 10. Likewise, the radially outer elastomeric joint body 114 becomes thicker in the circumferential direction nearer the outer band 200 to which it is attached. In the embodiment shown, the elastomeric joint body 114 flairs outward forming a protrusion 118 nearest the outer band 200.

In the embodiment shown, a membrane 132 is used to reinforce the nose section 130 of the spoke 100. A first cord portion 172 and a second cord portion 170 of the nose reinforcement membrane are closer to the center first support element 142 and second support element 144 of the spoke respectively than the elongate middle cord portion 174 of the membrane 132. In this particular embodiment, the ends 172, 170 of the cords of the nose reinforcement membrane 132 lie closer to the center of the support elements 142, 144 of the spoke 100 than the middle portion 174 of the nose reinforcement membrane 132. The membrane structure 132 of the embodiment shown is comprised of polyester fibers made from an 1100 by 2 cord with a pace of approximately 1 mm and a tensile modulus of approximately 3,750 MPa. Such reinforcement fibers are similar to that commonly used in the radial cords of a pneumatic tire. The rubber surrounding the reinforcements of the membrane has a modulus of approximately 5 MPa. For the embodiment shown, this rubber is of a type used in the construction of a conventional pneumatic radial tire. Alternatively, other membrane reinforcement materials may be used, including using cords of other materials, such as aramid, cotton, nylon or rayon or combinations thereof. Alternatively, the reinforcement pace, filament count, cord count and diameter may vary. In the embodiment shown, the reinforcement membrane 132 extends approximately one-fifth of the height of the spokes, generally co-extensive with the generally triangular shaped nose elastomeric joint body 136. In the embodiment shown, the elastomeric joint body 136 thickens and flairs outward in the circumferential direction near the middle section between the radially inner and radially outer spoke legs 142, 144, forming a protrusion 138 at approximately the midpoint of the elastomeric joint body 136.

The reinforcement cords of the reinforcement membranes 132 of the exemplary embodiment are oriented generally in the radial direction along the length of the membranes.

The legs 142, 144 of the spoke 100 are comprised of fiber reinforced plastic reinforcements surrounded by a rubber to form a membrane. The leg membranes 142, 144 possess a flexural rigidity of approximately 140,000 N-mm$^2$. In this particular embodiment, the filaments have a diameter of approximately 1 mm with a pace of about 2 mm apart. The filaments of the particular embodiment shown are glass reinforced resin formed by pultrusion. The filaments of the embodiment have a modulus of approximately 10 MPa. Alternatively other reinforcements may be used, including carbon fiber such as graphite epoxy, glass epoxy or aramid reinforced resins or epoxy or combinations thereof. Unreinforced plastic reinforcements or metallic reinforcements may also be used, provided they have sufficient flexural rigidity for the nominal loads intended to be supported. Alternatively other pacing and other diameters diameter of the membranes and reinforcements may be used. The legs 142, 144 of the spoke 100 have a relatively large stiffness compared to the other components comprising the spoke 100. The legs 142, 144 resist act resiliently and have a large bending stiffness allowing the nose portion 130 of the spoke to act as a joint body connecting the radially inner leg 142 with the radially outer leg 144. The feet 112, 114 act as second and third joint bodies, connecting the radially inner leg 142 to the hub and the radially outer leg 144 with the outer band 200.

Figure 6:
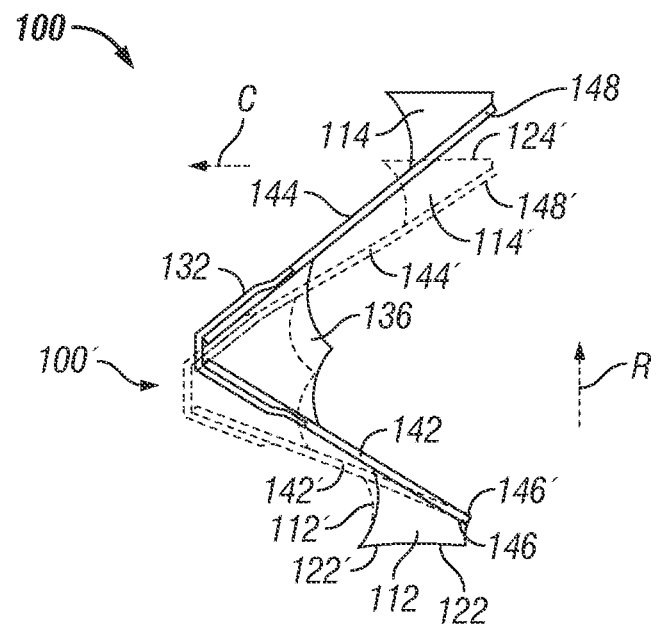
FIG. 6 provides a side view of the embodiment of the invention forming a part of a tire, the embodiment in an unloaded state (shown in solid lines) and under nominal loading conditions in compression (shown in dashed lines).

FIG. 6 shows a partial lateral section view of the exemplary embodiment of a spoke 100 attached to an outer tread band 200 and hub 12 and forming a part of a tire 10. In the particular embodiment shown, 64 spokes are attached around the inner circumference of the outer tread band 200. Under nominal loading conditions, for the tire of the exemplary embodiment 215/45 R17 sized tire shown here, the tire deflects 20 mm from the unloaded state. In the exemplary embodiment, 500 kg of mass load (approximately 4,900 N force) was used to approximate the nominal loading condition of the tire.

When the spoke 100 is deformed radially inward, undergoing compression between the radially outer foot 114 and radially inner foot 112, the elastomeric joint body 136 of the nose 130 undergoes compression between the radially inner leg 142 and radially outer leg 144 of the spoke. The radially outer elastomeric joint body 114 of the radially outer foot 114 undergoes compression along the portion closest to the nose 130 and undergoes tension on the distal portion of the elastomeric joint body 114.

Similarly at the radially inner foot 112, when the spoke 100 is deformed radially inward, the elastomeric joint body 112 of the radially inner foot 112 undergoes compression along the portion closest to the nose 130 and undergoes tension on the distal portion of the elastomeric joint body 112.

The dashed lines in FIG. 6 show the spoke 100 undergoing compression between the radially outer foot 114' and the radially inner foot 112'. The compressed spoke 100' is shown positioned with the hub mating surface 122, 122' fixed in position while the radially outer foot 114, 114' is displaced radially inward. As such, it may be observed that the radially inner portion 146, 146' of the radially inner leg 142, 142' is displaced radially outward when the spoke is compressed such that the radially inner portion 146' of the radially inner leg 142' moves radially outward relative to the radially inner surface 122' of the radially inner foot 112'. Likewise, a similar displacement occurs at the radially outer foot 114, 114' with the radially outer portion 148, 148' of the radially outer leg 144, 144' is displaced radially inward when the spoke is compressed such that the radially outer portion 148' of the radially outer leg 144' moves radially inward relative to the radially outer surface 124' of the radially outer foot 114'. The construction of the spoke permitting displacement of the radially outer portion 148, 148' of the radially outer leg 144, 144' and radially inner portion 146, 146' of the radially inner leg 142, 142' is referred herein as having a "free" spoke end.

The nose portion 130 of the present embodiment possesses a reinforcement membrane 132 which constrains the radially inner portion of the radially outer spoke 144 and radially outer portion of the radially inner spoke 142, restraining them from displacing away from one another when the spoke is under compression. The elastomeric joint body 136 undergoes compression when the spoke 100 is compressed. It may be observed that the portion of the elastomeric joint body 136 farthest from the reinforcement membrane 132 is contracted radially as the spoke 100 is compressed. The construction of the spoke disallowing displacement of the radially inner portion of the radially outer leg 144 and radially outer portion of the radially inner leg 142 may be referred herein as being "constrained" or "not free."

When the spoke is compressed, as shown in this figure by the dashed lines, the nose reinforcement membrane 132 is under tension. The positioning of the ends 170, 172 of the reinforcement membrane 132 closer to the reinforcement filaments reduces the initiation cracks and delamination of the reinforcement membrane 132 under prolonged use or certain other conditions.

Figure 7:
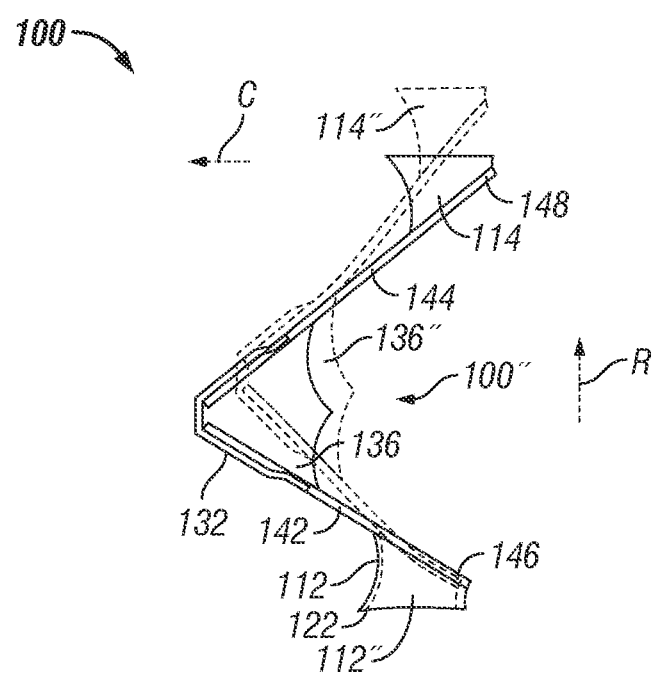
FIG. 7 provides a side view of the embodiment of the invention forming a part of a tire, the embodiment in an unloaded state (shown in solid lines) and under nominal loading conditions in tension (shown in dashed lines).

FIG. 7 shows the same embodiment when in tension such that the radially outer foot 114, 114" is displaced away from the radially inner foot 112, 112". The spoke 100 shown generally unloaded in solid lines and also the spoke 100' is shown in tension by the dashed lines. Note how the portions of the feet 112, 112", 114, 114" which underwent compression when the spoke was in compression are undergoing tension when the spoke is undergoing tension as shown in the present figure. Likewise the portions of the elastomeric joint bodies of the feet 112, 112", 114, 114" which underwent tension when the spoke was in compression are undergoing compression when the spoke is undergoing tension as shown in the present figure. The elastomeric joint body 136, 136" of the nose portion 130 undergoes tension in the portion closest to the feet 112, 112", 114, 114" of the spoke 100, 100".

Figure 8:
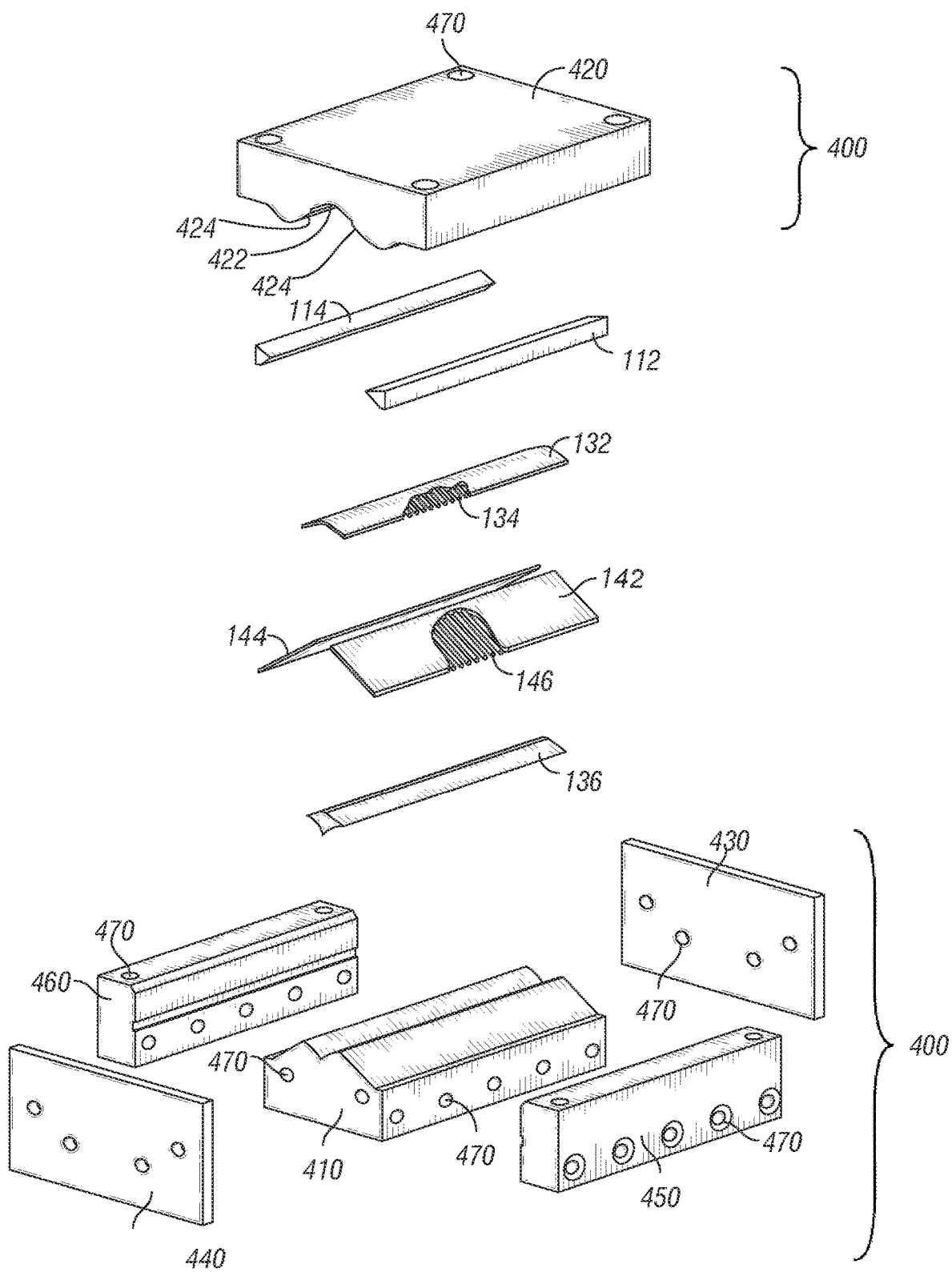
FIG. 8 provides a perspective view of an exemplary embodiment of a mold used for forming a spoke embodiment of the invention. The resilient composite structure's components are shown, with some components having a portion of the elastic material removed to show reinforcement location and orientation.

FIG. 8 shows an exploded perspective view of a mold 400, 410, 420, 430, 440, 450, 460 used to manufacture an individual spoke 100. The spoke components are shown separated as they are placed into the mold. Some of the spoke components show the orientation of the reinforcement fibers and cords. For example, the nose reinforcement membrane 132 reinforcements 134 are shown in the partial cutaway view of that component. The reinforcements are shown in this embodiment to run parallel to one another and along the width of the reinforcement membrane 132. A step 422 in the nose portion of the mold accommodates the middle portion of the nose reinforcement membrane 132 but the protruding portion 424 adjacent to the step 422 presses the ends of the reinforcement membrane 132 closer to the leg reinforcements 146. Both of the legs 142, 144 are shown and the radially inner leg 142 is shown with a partial cut-away showing the composite glass resin reinforcements 146 positioned parallel to one another and along the width of the radially inner leg 142. While the reinforcements 146 of the legs 142, 144 are resiliently flexible, the fiber reinforcement 134 of the nose reinforcement membrane 132 are flexible enough to be permanently deformed upon molding of the surrounding rubber matrix material.

Once the various uncured components are laid in place over the mold bottom 410, the mold 400 is closed and secured. Here the mold is closed with screw fasteners through apertures 470 and secured to threaded portions of the apertures 470 of the mold components. Tightening of the fasteners exert pressure, or/and additional pressure may be applied to the mold top during curing. Heating of the mold 400 heats the rubber components within and cures the rubber, adheres the rubber components together and forms a composite spoke having excellent resilient qualities of sufficient durability for use as a structural element in an automotive non-pneumatic tire. Other uses for the resilient composite structure may include vibration isolation mounts, such as motor mounts, transmission mounts or seat mounts, or used as a resilient hinge to allow movement of one object relative to another object otherwise connected by the resilient composite structure.

The "v-shape" of the embodiments of the spoke shown and described herein allow the adjacent spokes to "nest" and give linear spring rate when deflected radially over a distance approximately equal to the tires vertical deflection. The nesting of the spokes avoids adjacent spokes from clashing under normal loading conditions.

It should be understood by a person of ordinary skill in the art that the stiffness of the spoke may be adjusted by adjusting the length of the "v" of the "v-shaped spoke", the constituent material moduli and the internal architecture of the spoke.

Figure 9:
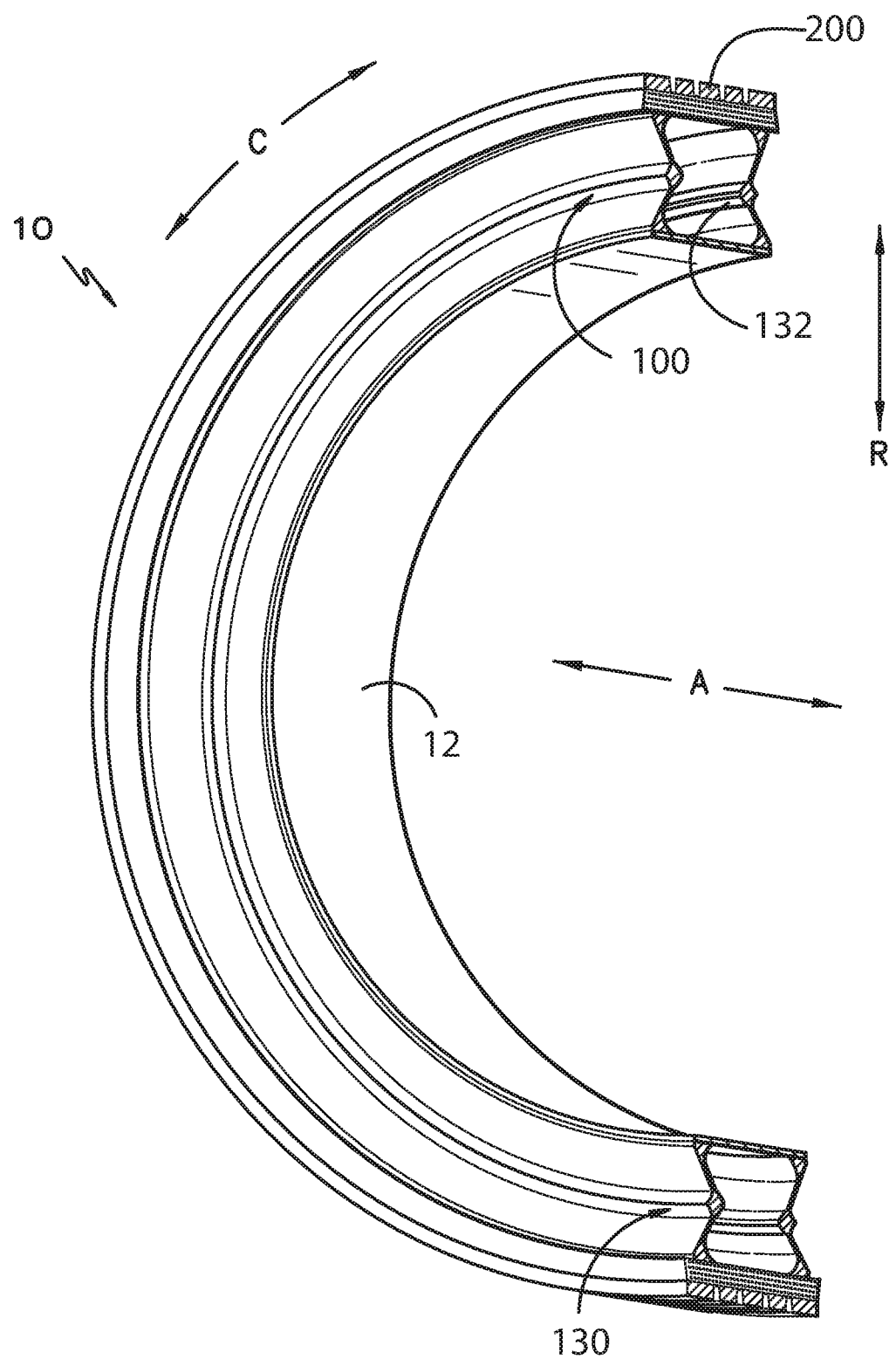
FIG. 9 provides a perspective section view of an exemplary embodiment of the invention incorporated into a toroid shaped spoke.

It should be understood that other web element configurations and geometries may be used within the scope of the invention, including web elements which are interconnected such as where they may form a honeycomb or other pattern. While when the resilient composite structure is configured as a spoke they are configured to extend in a lateral direction across the width of the tire, it should be understood that they may be configured at other angles, such as at an angle to the lateral direction of the tire. For example, the spoke may extend at a diagonal between the circumferential direction and the lateral direction of the tire. In yet other embodiments, the spoke may be turned 90 degrees to run circumferentially around the diameter of the tire as shown in FIG. 9, thereby resembling a sidewall of a pneumatic tire. In such a configuration, the spoke would be configured like a continuous toroid about the hub of the wheel. In the example embodiment shown in FIG. 9 two toroidal shaped spokes 100 are shown with the nose reinforcement membrane 132 positioned upon the interior of the tire cavity. In other embodiments, not shown, the spokes may be reversed such that the concave portion of the spoke nose is facing the interior cavity and the nose reinforcement membrane 132 is facing the away from the equatorial plane of the tire.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A resilient composite structure for connecting a first surface and a second surface comprising:
  a first support element having a first end, a second end, a first side and a second side;
  a second support element having a first end, a second end, a first side and a second side, said second support element forming an interior angle with said first support element, said interior angle positioned on the first side of said first support element and the first side of said second support element;
  a first elastomeric joint body connecting said first support element first end and said second support element second end, said first elastomeric joint body positioned on the first side of said first support element and the first side of said second support element;
  wherein the first support element and second support element are comprised each of one or more elongated reinforcements having a flexural rigidity greater than the elastomer comprising the first elastomeric joint body;
  a second elastomeric joint body for connecting said first support element second end to said first surface and positioned on said second side of said first support element; and
  a third elastomeric joint body for connecting said second support element first end to said second surface and positioned on said second side of said second support element;
  wherein said first support element second end and said second support element first end are otherwise free ends;
  a reinforcement membrane comprised of a plurality of cords, each cord having a first cord portion and a second cord portion and an elongate middle cord portion between the first cord portion and second cord portion, the reinforcement membrane connecting the first support element and second support element wherein said first cord portion of each cord of the plurality of cords is closer to the center of the first support element elongated reinforcements than the elongate middle cord portion and said second cord portion of each cord of the plurality of cords is closer to the center of the second support element elongated reinforcements than the elongate middle cord portion.

2. The resilient composite structure of claim 1 wherein said resilient composite structure is part of a tire and said first surface is a radially outer surface of a hub and said second surface is a radially inner surface of an outer tread band, the hub, the resilient composite structure and the outer tread band forming the tire.

3. The resilient composite structure of claim 2 wherein said resilient composite structure forms a spoke extending from a first lateral side of the tire to a second lateral side of the tire.

4. The resilient composite structure of claim 2 wherein said resilient composite structure forms a toroid shaped spoke extending around the circumference of the hub.

5. The resilient composite structure of claim 1 wherein each cord of the plurality of cords of the reinforcement membrane have a first end and a second end and the first cord portion of each cord of the plurality of cords of the reinforcement membrane is located at the first end of the cord and the second cord portion of each cord of the plurality of cords of the reinforcement membrane is located at the second end of the cord.

6. The resilient composite structure of claim 1 wherein the reinforcement membrane is positioned on the second side of the first support element and the second side of the second support element.

7. The resilient composite structure of claim 1 wherein the reinforcement membrane is comprised of cords comprised of a material selected from a group consisting of polyester, rayon, aramid, nylon, and cotton.

8. The resilient composite structure of claim 1 wherein said first support element and said second support element are each comprised of a fiber reinforced plastic.

9. The resilient composite structure of claim 8 wherein the first support element and second support element are comprised of an elastomer surrounding the fiber reinforced plastic.

10. The resilient composite structure of claim 9 wherein the fiber reinforced plastic are comprised of a plurality of fibers oriented in the direction extending from the first end to the second end of each of the support elements.

11. The resilient composite structure of claim 1 wherein the joint bodies are comprised of a rubber elastomer.

12. The resilient composite structure of claim 1 wherein the joint bodies are comprised of a rubber elastomer.

13. A tire having a resilient composite structure connecting an outer surface of a hub and an inner surface of an outer tread band comprising:
a first support element having a first end, a second end, a first side and a second side;
a second support element having a first end, a second end, a first side and a second side, said second support element forming an interior angle with said first support element, said interior angle positioned on the first side of said first support element and the first side of said second support element;
a first elastomeric joint body connecting said first support element first end and said second support element second end, said first elastomeric joint body positioned on the first side of said first support element and the first side of said second support element;
wherein the first support element and second support element are comprised each of one or more elongated reinforcements having a flexural rigidity greater than the elastomer comprising the first elastomeric joint body;
a second elastomeric joint body for connecting said first support element second end to said outer surface of a hub and positioned on said second side of said first support element; and
a third elastomeric joint body for connecting said second support element first end to said inner surface of an outer tread band and positioned on said second side of said second support element;
wherein said first support element second end and said second support element first end are otherwise free ends;
a reinforcement membrane comprised of a plurality of cords, each cord having a first cord portion and a second cord portion and an elongate middle cord portion between the first cord portion and second cord portion, the reinforcement membrane connecting the first support element and second support element wherein said first cord portion of each cord of the plurality of cords is closer to the center of the first support element elongated reinforcements than the elongate middle cord portion and said second cord portion of each cord of the plurality of cords is closer to the center of the second support element elongated reinforcements than the elongate middle cord portion.

14. The resilient composite structure of claim 13 wherein said resilient composite structure forms a spoke extending from a first lateral side of the tire to a second lateral side of the tire.

15. The resilient composite structure of claim 13 wherein said resilient composite structure forms a toroid shaped spoke extending around the circumference of the hub.

16. The resilient composite structure of claim 13 wherein each cord of the plurality of cords of the reinforcement membrane have a first end and a second end and the first cord portion of each cord of the plurality of cords of the reinforcement membrane is located at the first end of the cord and the second cord portion of each cord of the plurality of cords of the reinforcement membrane is located at the second end of the cord.

17. The resilient composite structure of claim 13 wherein the reinforcement membrane is positioned on the second side of the first support element and the second side of the second support element.

18. The resilient composite structure of claim 13 wherein the reinforcement membrane is comprised of cords comprised of a material selected from a group consisting of polyester, rayon, aramid, nylon, and cotton.

19. The resilient composite structure of claim 18 wherein said first support element and said second support element are each comprised of a fiber reinforced plastic.

20. The resilient composite structure of claim 19 wherein the fiber reinforced plastic are comprised of a plurality of fibers oriented in the direction extending from the first end to the second end of each of the support elements.

* * * * *